United States Patent [19]
Hirano et al.

[11] Patent Number: 4,789,654
[45] Date of Patent: Dec. 6, 1988

[54] HYDROTREATING CATALYSTS

[75] Inventors: Tetsuji Hirano; Goro Sato; Hidehiro Higashi; Teruo Migita; Yoshio Eto, all of Kitakyushu, Japan

[73] Assignee: Catalysts & Chemicals Industries Co., Ltd., Tokyo, Japan

[21] Appl. No.: 928,219

[22] PCT Filed: Mar. 27, 1986

[86] PCT No.: PCT/JP86/00143

§ 371 Date: Oct. 31, 1986

§ 102(e) Date: Oct. 31, 1986

[87] PCT Pub. No.: WO86/05715

PCT Pub. Date: Oct. 9, 1986

[30] Foreign Application Priority Data

Mar. 29, 1985 [JP] Japan ................... 60-66267

[51] Int. Cl.$^4$ ............................................. B01J 29/10
[52] U.S. Cl. ........................................ 502/66; 502/74
[58] Field of Search ................................ 502/66, 74

[56] References Cited

U.S. PATENT DOCUMENTS

| 3,574,092 | 4/1971 | Mitsche | 502/66 |
| 4,120,825 | 10/1978 | Ward | 502/66 |
| 4,134,856 | 1/1979 | Itoh et al. | 502/66 |
| 4,515,903 | 5/1985 | Otterstedt et al. | 502/66 |
| 4,546,090 | 10/1985 | Olson et al. | 502/69 |

FOREIGN PATENT DOCUMENTS 1050956  3/1979  Canada ................... 502/68

*Primary Examiner*—Carl F. Dees
*Attorney, Agent, or Firm*—Flynn, Thiel, Boutell & Tanis

[57] ABSTRACT

A catalyst comprising metal components selected from Group VIA and Group VIII of the Periodic Table on a carrier comprising an alumina-containing inorganic oxide and a faujasite type Y zeolite having a specified particle size distribution, can exhibit a superior desulfurizing activity and produce an middle distillate such as kerosene and light gas oil in a high yield.

10 Claims, 2 Drawing Sheets

HYDROTREATING CATALYSTS

TECHNICAL FIELD

The present invention relates to a catalyst used suitably for hydrotreating heavy hydrocarbon oils. In more detail, the present invention relates to a hydrotreating catalyst that is capable of exhibiting a superior activity in the hydrodesulfurization of heavy oils represented by atomospheric residue and vacuum residue and further increasing the yield of an middle distillate such as kerosene and light gas oil.

BACKGROUND ART

Recently, as crude oils become more heavy, the art of desulfurization, demetalization and denitrification of heavy oils that contain asphaltene, resin and the like and further contain large amounts of organic metal compounds such as vanadium, nickel and the like, by contacting the heavy oil with a catalyst under hydrogen pressure is increasing in importance more and more. On the other hand, as the demand for petroleum fractions varies, there is a tendency that middle distillates are in short supply. Because of this, there is rising the demand that on hydrotreating heavy oils, desulfurization, demetalization and denitrification should be conducted while suppressing the by-production of light fractions as much as possible and obtaining the middle distillates such as kerosene and light gas oil in a high yield.

In the hydrotreating process of heavy oils, there is generally used a catalyst comprising metal components selected from Group VIA and/or Group VIII of the Periodic Table as hydrogenating active components supported on a carrier, said carrier consisting of an alumina-containing inorganic oxide and a zeolite. The desulfurization activity of the catalyst of this sort used for hydrotreatment of heavy oils generally depends upon the quantities of alumina-containing inorganic oxides, and the yield of middle distillate generally depends upon the quantity of said zeolite. Accordingly, the fact is that in conventional hydrotreating catalysts, the desulfurization activity and the yield of middle distillate are in a contradictive relation, for instance when a catalyst of high desulfurization activity is used, it is impossible to expect the high level yield of middle distillate.

As described above, in the light of the demand of the industry and the problems inherent in the conventional art, the inventors have devoted themselves to various investigations to develop a catalyst that can bring about good results not only in the point of desulfurization activity but also in the point of yield of middle distillate and found that a catalyst comprising a hydrogenating active component supported on a catalyst carrier consisting a precursor of an alumina-containing inorganic oxide and a specified zeolite as referred to afterwards can satisfy the object.

DISCLOSURE OF INVENTION

The hydrotreating catalyst according to the present invention is one that comprises a hydrogenating active component on a carrier consisting of an alumina-containing inorganic oxide and a zeolite, wherein a carrier is prepared by mixing a precursor of an alumina-containing inorganic oxide and a faujasite type Y Zeolite having the following particle size distribution, forming this mixture into a particle having desired shape and dimensions, and then drying and calcining this particle, and said catalyst is such that metal components selected from Group VIA and Group VIII of the Periodic Table are carried on the thus prepared carrier.

Particle size distribution

| Particle diameter 3μ or less | 20 wt. % or less |
|---|---|
| Particle diameter 3–12μ | 50–70 wt. % |
| Particle diameter 12–30μ | 10–40 wt. % |

BEST MODE OF CARRYING OUT THE INVENTION

Figure 1:
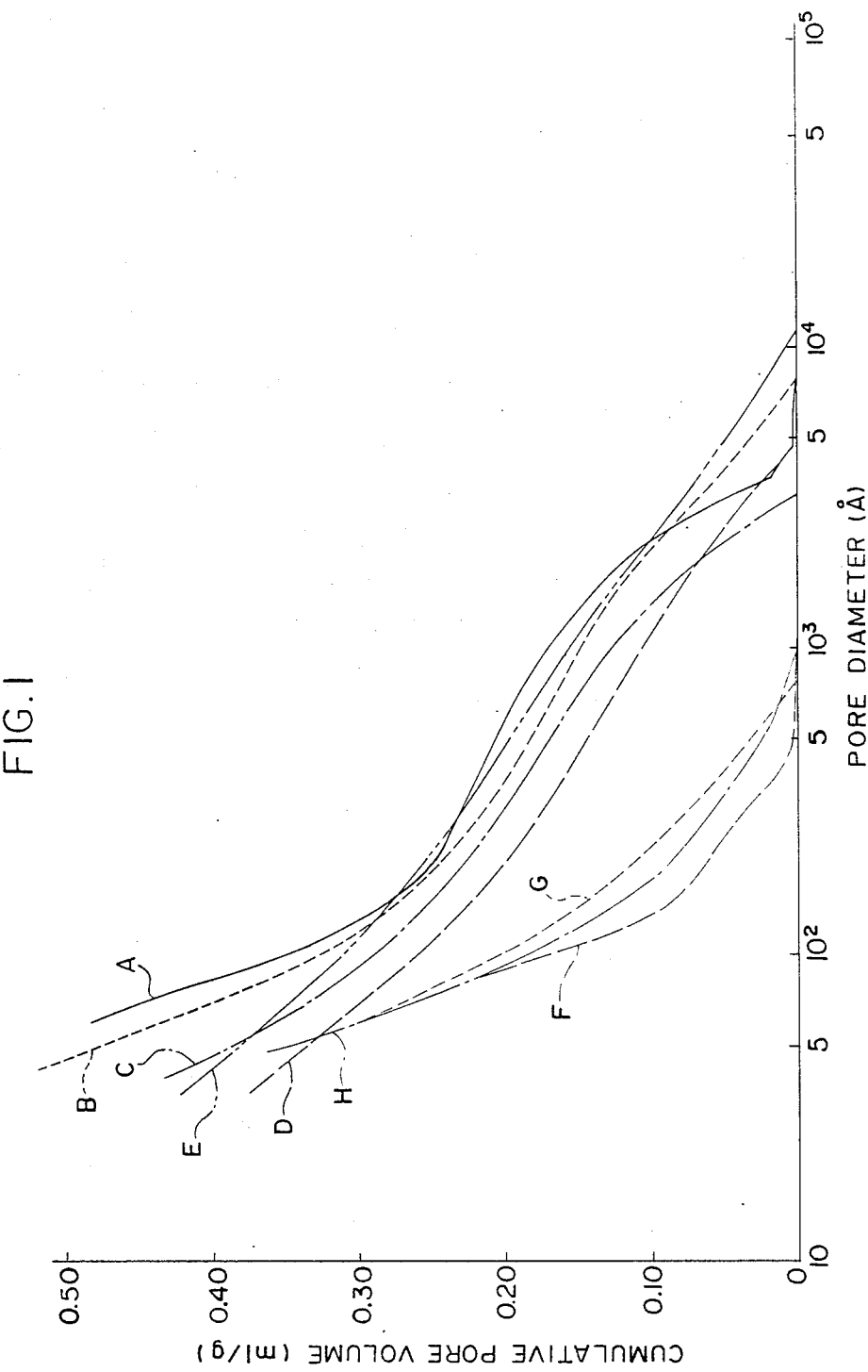
FIG. 1 shows the integral pore size distribution curves of catalysts A, B, C, D and E according to the present invention and comparative catalysts of F, G and H.

As the alumina-containing inorganic oxides, there are used alumina, alumina-boria, alumina-silica, alumina-titania, alumina-zirconia and the like. Among them, alumina is a typical alumina-containing inorganic oxide, and an alumina hydrate consisting essentially of pseudoboehmite having a crystal size in the range of 50–150 Å is an especially preferable precursor of alumina-containing inorganic oxide. The alumina hydrate consisting essentially of pseudoboehmite may be prepared by the neutralization reaction between alkali aluminates and acidic aluminum salts. As the crystal size of the pseudoboehmite obtained according to this way is about 30 Å, it is preferable to grow this crystal size to the range of 50–150 Å by heating the alumina hydrate obtained by the neutralization reaction, while stirring under the weakly alkaline condition of pH 8–12, to a temperature of 50° C. or more. The degree of growth depends upon the concentration of alumina hydrate, pH condition and temperature condition, but is generally proportionate to the treating time. The pseudoboehmite seen through an electron microscope is a fibrous particle whose diameter is several tens Å and whose length is several hundreds-several thousand Å. It is to be noted, however, the crystal size of pseudoboehmite referred to in the present invention is all the values defined by the Debye-Seherrer formula from the half width of $2\theta = 38.4°$ (CuKα) by the X-ray diffraction method. The other component that serves for the catalyst carrier of the present invention together with the above mentioned alumina-containing inorganic oxides is a faujasite type Y zeolite. The condition required for said zeolite is to have such a particle size distribution that the particles having a particle diameter of 3μ or less are contained in a ratio of 20 wt.% or less, the particles having a particle diameter of 3–12μ are contained in a ratio of 50–70 wt.% and the particles having a particle diameter of 12–30μ are contained in a ratio of 10–40 wt.%. In case the particle size distribution deviates from this range, the Pore Volume of macro pores (pores having a diameter of 600 Å or more) decreases and thus the life of catalyst is shortened conspicuously, and further the effective surface area of zeolite decreases and thus the catalytic activity deteriorates. The faujasite type Y zeolite used in the present invention has a unit lattice constant in the range of 24.25–24.50 Å, preferably in the range of 24.30–24.45 Å. The unit lattice constant of the commercially available Y faujasite is normally about 24.67 Å, but its unit lattice constant can be decreased by for instance calcining said faujasite in the steam atmosphere. However, it is to be noted that the means for preparing the faujasite type Y zeolite usable in the present invention should not be limited to the above examples.

The faujasite type Y zeolite, whose unit lattice constant is in the above range, is extremely desirable as the carrier component of the catalyst for hydrotreating heavy oils because said zeolite has a large Pore Volume and pore diameters extending from several tens Å to several hundreds Å and further has a large external surface area. In the case of the zeolite whose unit lattice constant is over 24.50 Å, the greater part of pores has a pore diameter of 10 Å or less and the acidity is too high. Therefore, the catalyst using this zeolite as the carrier component can never improve the yield of middle distillate because the quantities of gas and naphtha components formed increase. In the case of the zeolite whose unit lattice constant is conversely less than 24.54 Å, it is impossible to obtain a catalyst of high hydrocracking activity from the zeolite of this sort because the degree of breakage of its crystal structure is high and its activity is too low. According to the present invention, a carrier is first prepared from the mixture of the above defined alumina-containing inorganic oxide and faujasite type Y zeolite. Referring to the mixing ratio of the alumina-containing inorganic oxide to the zeolite, it is proper to select it so that 20-80 wt.% of the carrier is composed of the zeolite and 80-20 wt.% of the carrier is composed of the alumina-containing inorganic oxide. It is preferable that the carrier is composed of 30-70 wt.% of the zeolite and 70-30 wt.% of the alumina-containing inorganic oxide, and it is more preferable that the carrier is composed of 40-70 wt.% of the zeolite and 60-30 wt.% of the alumina-containing inorganic oxide. The alumina-containing inorganic oxide and the zeolite may be mixed by a kneader so far as it does not exert a substantial influence upon the particle size distribution of the zeolite. At this time, the mixture is normally concentrated into a solid concentration suitable for forming. Then, the mixture is formed into a particle having desired configuration and dimensions by for instance an extruder, and same is dried in a usual manner and thereafter is calcined at a temperature of 400°-800° C. for about 0.5-5 hours.

On the thus obtained catalyst carrier is carried a hydrogenating active component comprising metals selected from Group VIA and Group VIII of the Periodic Table. As the carrying means, there is normally employed the impregnation method. As the metals selected from Group VIA effective in the present invention there may be enumerated molybdenum and/or tungsten, and as the metals selected from Group VIII there may be enumerated cobalt and/or nickel. The quantity of the hydrogenating active component carried should suitably be composed of Group VIA metal component in the quantity of 5-20 wt.% calculated as oxide and group VIII metal component in the quantity of 1-10 wt.% calculated as oxide respectively per 100 wt. parts of the carrier. After the metal component has been carried, it is dried and calcined in the usual manner, thereby obtaining a hydrotreating catalyst according to the present invention.

The catalyst of the present invention prepared by the above mentioned method, which is composed of the alumina-containing inorganic oxide and the faujasite type Y zeolite having the specified particle size distribution and unit lattice constant, is superior in the desulfurization activity and further possesses 0.1 ml/g or more of Volume of macro pores (pore diameter: 600 Å or more). This macro pore is not readily blocked even by deposit of carbonaceous substances and metallic contaminants. Therefore, even high molecular weight hydrocarbons can enter the pore and be cracked. And, it is considered that as the cracked product can directly come out of the pore, overcracking is suppressed and consequently the yield of middle distillate is improved. The catalyst according to the present invention is suitable for hydrotreating heavy oils represented by atmospheric residue and also is usable for hydrotreating vacuum gas oil, visbreaking oil, tar sand oil and the like. Further, the catalyst according to the present invention is usable under a wide range reaction conditions extending from relatively mild conditions to severe conditions, said reaction conditions including the reaction temperature of 350°-450° C., the reaction pressure of 50-200 Kg/cm$^2$, the hydrogen/oil ratio of 300-2,500 Nm$^3$/Kl. LHSV of 0.1-5 hr$^{-1}$, the hydrogen concentration of 70 vol% or more and the like.

The present invention will be explained concretely with reference to Examples hereinafter, but the present invention should not be limited thereto.

EXAMPLES

Example 1

| | |
|---|---|
| Particle diameter 3μ or less | 10 wt. % |
| Particle diameter 3-12μ | 66 wt. % |
| Particle diameter 12-30μ | 24 wt. % |
| (Average particle diameter = 7.5μ) | |

A commercially available sodium-faujasite type Y zeolite was ground, and thereafter screened to obtain a faujasite type Y zeolite having the above mentioned particle size distribution (unit lattice constant=24.65 Å; SiO$_2$/Al$_2$O$_3$ molar ratio=5.0). This zeolite was subjected to ammonium ion-exchange in a usual manner to thereby obtain an ammonium-exchange Y zeolite whose alkali metal content was 1.2 wt.% as Na$_2$O. 1 Kg of this zeolite was put in a heating vessel, steamed at 600° C. for 3 hours, thereafter cooled to a room temperature, then dealuminized with 3.2 l of 3N hydrochloric acid, and washed with water to thereby obtain a zeolite slurry (A). It was confirmed that the zeolite in this slurry had the unit lattice constant of 24.37 Å and the SiO$_2$/Al$_2$O$_3$ molar ratio of 12.5 (calculated from chemical analysis), and took the same particle size distribution as described above.

On the other hand, an alumina slurry was obtained by adding an aqueous aluminum sulfate solution (concentration 2.5 wt.% as Al$_2$O$_3$) to 160 Kg of an aqueous sodium aluminate solution (concentration 5.0 wt.% as Al$_2$O$_3$) slowly for 10 minutes until the slurry has a pH of 7.0. This slurry was filtered. Thereafter, the resulting cake was washed with a 0.2 wt.% of ammonia water for removing the by-produced salt, thereby obtaining a pseudoboehmite-containing alumina hydrate. Then, this alumina hydrate was dispersed in an ammonia water. This dispersion slurry was put in tank equipped with circulator, stirrer and heater, and was heated and stirred at 95° C. for 20 hours under the condition of pH10.05 for growing the crystal of said pseudoboehmite. This alumina hydrate was put in a kneader, and mixed while heating to thereby obtain a plasticizable mixture (x). A part of this mixture was dried, and the crystal diameter was measured. It was 100 Å.

Next, 600 g (dry basis) of the previously prepared zeolite slurry (A) was picked, and was mixed with said alumina mixture (x) (which corresponds to 400 g dry basis). This mixture was put in a kneader, and was mixed while heating for 2 hours. The thus obtained mixture was formed into an 1 mm $\phi$ pellet in a usual manner, thereafter was dried at 120° C. for 10 hours, and was calcined at 550° C. for 2 hours to thereby obtain a carrier. 500 g of this carrier was impregnated with an aqueous paramolybdate solution and an aqueous cobalt nitrate solution in a usual manner, and further calcined at 550° C. for 2 hours to thereby obtain a catalyst A. The quantities of carried molybdenum and cobalt of this catalyst were 10.7 wt.% and 4.2 wt.% respectively as oxide. The crushing strength of this catalyst was 1.0 Kg/mm. The integral pore size distribution curve of this catalyst is shown in FIG. 1.

Example 2

A commercially available sodium-faujasite type Y zeolite was ground, and thereafter screened to thereby obtain a zeolite having the under mentioned particle size distribution.

| Particle diameter 3μ or less | 11 wt. % |
| Particle diameter 3–12μ | 51 wt. % |
| Particle diameter 12–30μ | 38 wt. % |

This zeolite was subjected to the same ammonium ion-exchange, steaming and hydrochloric acid treatment as Example 1, and was washed with water to thereby obtain a slurry (B). It was confirmed that the zeolite in this slurry had the unit lattice constant of 24.39 Å and the $SiO_2/Al_2O_3$ molar ratio of 12.0 (calculated from chemical analysis), and took the same particle size distribution as described above.

600 g (dry basis) of the above mentioned zeolite slurry (B) was picked, and was mixed with a commercially available alumina powder (PURAL SB product of CONDEA Co.) (which corresponds to 400 g dry basis). This mixture was put in a kneader, and then was mixed while heating for 2 hours, thereafter was formed into an 1 mm $\phi$ pellet, and was dried and calcined to thereby obtain a carrier. A hydrogenating active component was carried on 500 g of this carrier according to the same manner as Example 1 to thereby obtain a catalyst B containing 10.9 wt.% of $MoO_3$ and 4.3 wt.% of CoO.

The integral pore size distribution curve of this catalyst is shown in FIG. 1.

Example 3

A commercially available sodium-faujasite type Y zeolite was ground, and thereafter screened to obtain a zeolite having the under mentioned particle size distribution.

| Particle diameter 3μ or less | 18 wt. % |
| Particle diameter 3–12μ | 68 wt. % |
| Particle diameter 12–30μ | 14 wt. % |

This zeolite was subjected to the same ammonium ion-exchange, steaming and hydrochloric acid treatment as Example 1, and was washed with water to thereby obtain a slurry (C). It was confirmed that the zeolite in this slurry had the unite lattice constant of 24.37 Å and the $SiO_2/Al_2O_3$ molar ratio of 12.0 (calculated from chemical analysis), and took the same particle size distribution as mentioned above.

The alumina mixture (x) obtained in Example 1 (which corresponds to 350 g of $Al_2O_3$) was added with 150 g (dry basis) of a commercially available silica sol (product of Catalysts & Chemicals Industries, Co., Ltd.), and was mixed. Then, 500 g (based on dry measure) of said zeolite slurry (C) was added thereto, and mixed in a kneader for 3 hours while heating. The thus obtained mixture was subjected to the same forming, drying and calcination as Example 1 to thereby obtain a 50 wt.% zeolite-15 wt.% $SiO_2$-25 wt.% $Al_2O_3$ carrier. 500 g of this carrier was impregnated with an aqueous paramolybdate solution and an aqueous cobalt nitrate solution, thereafter was dried and calcined to thereby obtain a catalyst C containing 12.5 wt.% of $MoO_3$ and 3.0 wt.% of $NiO_2$. The integral pore size distribution curve of this catalyst is shown in FIG. 1.

Example 4

The alumina mixture (x) obtained in Example 1 (which corresponds to 500 g of $Al_2O_3$) was added with 100 g (as oxide) of boric acid, and then was added to the zeolite slurry (A) prepared in Example 1. This mixture was formed, dried and calcined to thereby obtain a 40 wt.% zeolite-10 wt.% $B_2O_3$-50 wt.% $Al_2O_3$ carrier. The components such as molybdenum, nickel and cobalt were each carried on 500 g of this carrier to thereby prepare a catalyst D containing 11.2 wt.%, 0.9 wt.% or 1.5 wt.% respectively as oxide. The integral pore size distribution curve of this catalyst is shown in FIG. 1.

Example 5

The alumina mixture (x) obtained in Example 1 (which corresponds to 500 g of $Al_2O_3$) was mixed with 50 g (as oxide) of a commercially available titania sol (product of Ishihara Sangyo K.K.). Then, this mixture was added to the zeolite slurry (C) prepared in Example 3. The resulting mixture was formed, dried and calcined to thereby obtain a 60 wt.% zeolite-5 wt.% $TiO_2$-35 wt% $Al_2O_3$. Hydrogenating active components were carried on 500 g of this carrier according to the same procedure as Example 1 to thereby obtain a catalyst E containing 10.9 wt.% of $MoO_3$ and 4.3 wt.% of CoO. The integral pore size distribution curve of this catalyst is shown in FIG. 1.

Comparative Example 1

| Particle diameter 3μ or less | 52 wt. % |
| Particle diameter 3–12μ | 34 wt. % |
| Particle diameter 12–30μ | 14 wt. % |
| (Average particle diameter = 3.1μ) | |

A commercially available sodium-faujasite type Y zeolite was ground, and thereafter screened to obtain a faujasite type Y zeolite having the above mentioned particle size distribution. This zeolite was subjected to the same ammonium ion-exchange, steaming and hydrochloric acid treatment as Example 1, and was washed with water to thereby obtain a zeolite slurry (D). It was confirmed that the zeolite in this slurry had the unit lattice constant of 24.37 Å and the $SiO_2/Al_2O_3$ molar ratio of 12.5 (calculated from chemical analysis), and took the same particle size distribution as described above.

A catalyst F was prepared according to the exactly same procedure as Example 1 except that this zeolite slurry (D) was used in place of the zeolite slurry (A). The quantities of molybdenum and cobalt carried on this catalyst were to be 10.9 wt.% and 4.3 wt.% respectively as oxide, and the crushing strength of this catalyst was 0.9 Kg/mm. The integral pore size distribution curve of this catalyst F is shown in FIG. 1.

Comparative Example 2

A commercially available sodium-faujasite type Y zeolite was ground, and thereafter screened to obtain a zeolite having the under mentioned particle size distribution.

| Particle diameter 3μ or less | 13 wt. % |
| Particle diameter 3–12μ | 75 wt. % |
| Particle diameter 12–30μ | 12 wt. % |

This zeolite was subjected to the same ammonium ion-exchange, steaming and hydrochloric acid treatment as Example 1, and was washed with water to thereby obtain a slurry (E). The zeolite in this slurry was confirmed to have the unit lattice constant of 24.39 Å and the $SiO_2/Al_2O_3$ molar ratio of 13.0 (calculated from chemical analysis), and took the same particle size distribution as mentioned above.

A catalyst G was prepared according to the exactly same procedure as Example 1 except that this zeolite slurry (E) was used in place of the zeolite slurry (A). The quantities of molybdenum cobalt carried on this catalyst were to be 10.9 wt.% and 4.3 wt.% respectively as oxide. The integral pore size distribution curve of this catalyst F is shown in FIG. 1.

Comparative Example 3

A commercially available sodium-faujasite type Y zeolite was ground, and thereafter screened to obtain a zeolite having the under mentioned particle size distribution.

| Particle diameter 3μ or less | 38 wt. % |
| Particle diameter 3–12μ | 55 wt. % |
| Particle diameter 12–30μ | 7 wt. % |

This zeolite was subjected to the same ammonium ion-exchange, steaming and hydrochloric acid treatment as Example 1, and was washed with water to thereby obtain a slurry (F). The zeolite in this slurry was confirmed to have the unit lattice constant of 24.39 Å and the $SiO_2/Al_2O_3$ molar ratio of 13.0 (calculated from chemical analysis), and took the same particle size distribution as mentioned above.

Next, a catalyst H was prepared according to the exactly same procedure as Example 1 except that this zeolite slurry (F) was used in place of the zeolite slurry (A). The quantities of molybdenum and cobalt carried on this catalyst were to be 10.9 wt.% and 4.3 wt.% respectively as oxide. The integral pore size distribution curve of this catalyst F is shown in FIG. 1.

Catalytic performance test

For the purpose of comparing the performances of catalysts A–H obtained according to Examples and Comparative Examples, atomspheric residue was subjected to hydrotreament under the following conditions. A 300 cc catalyst-charged fixed bed (which is 19 mm in the inside diameter and 3 m in the length) was employed as a reactor.

Properties of charge stock

| Specific gravity (15/4° C.) | 0.976 |
| 343° C.+ (vol %) | 98.3 |
| Viscosity (cst. at 50° C.) | 885 |
| Sulfur (wt. %) | 4.08 |
| Vanadium (ppm) | 60.5 |
| Nickel (ppm) | 17.4 |

Reaction conditions

| Reaction pressure (Kg/cm$^2$) | 135 |
| Reaction temperature (°C.) | 400 |
| LHSV (hr$^{-1}$) | 0.3 |
| Hydrogen/oil ratio (Nm$^3$/Kl) | 800 |

Figure 2:
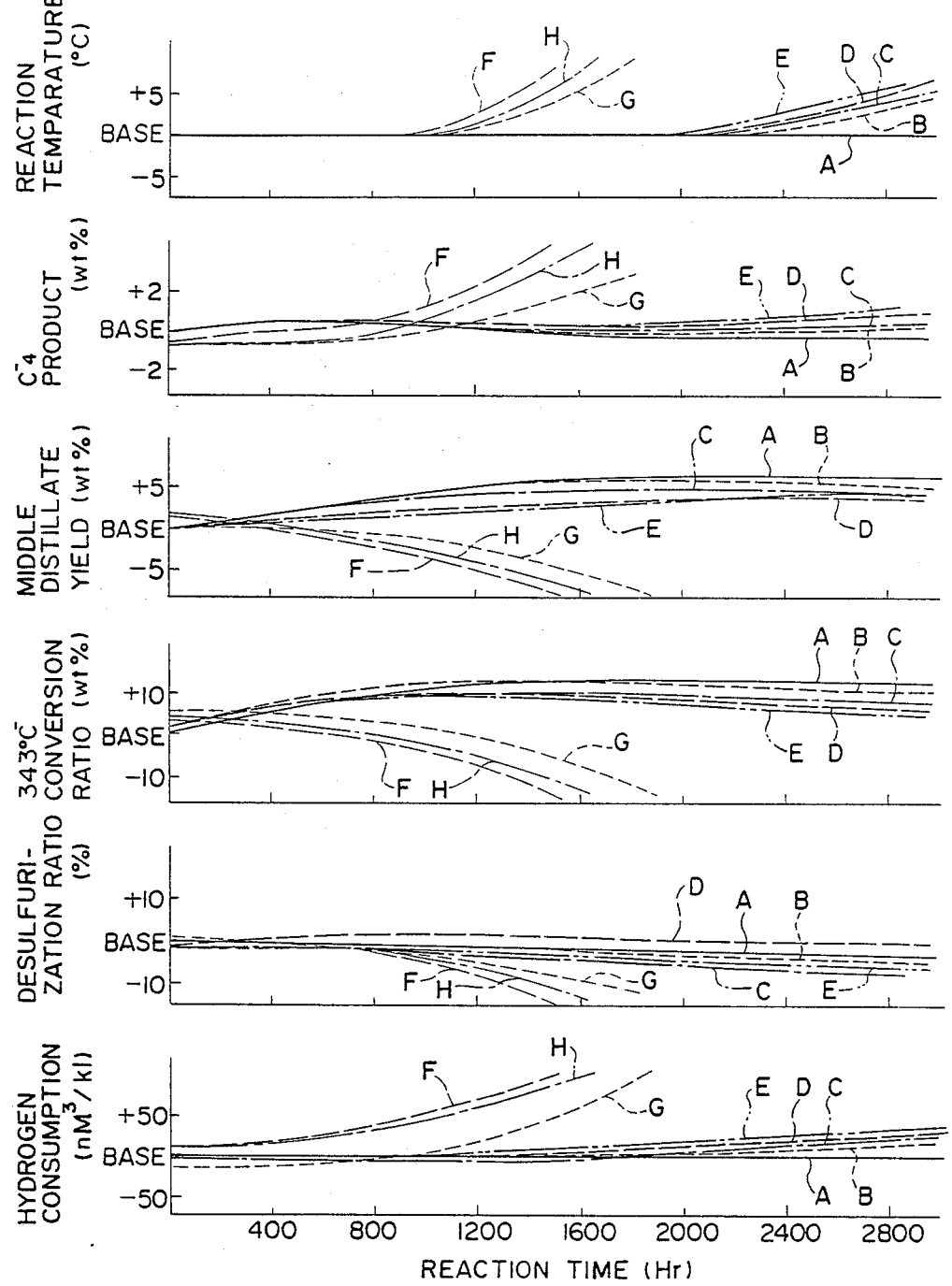
FIG. 2 is a graph showing the reaction results obtained by using catalysts A, B, C, D, E, F, G and H for hydrotreating atomospheric residue respectively.

The reaction results obtained from the start of reaction up to about 3,000 hours are shown in FIG. 2. As evident from FIG. 2, this inventions catalysts A, B, C, D and E exhibit superior results in the respective points of $C_4^-$ product rate, middle distillate yield, 343° C.− conversion ratio, desulfurization ratio and hydrogen consumption as compared with comparative catalysts F, G and H. Further, the catalysts according to the present invention is far superior in the catalyst life.

We claim:

1. A hydrotreating catalyst comprising a hydrogenation component supported on a carrier, said hydrogenation component being composed of metals selected from Group VIA and Group VIII of the Periodic Table, said carrier consisting essentially of a blend of an alumina-containing inorganic oxide and a faujasite Y zeolite, said carrier having been prepared by mixing (1) a precursor of said alumina-containing inorganic oxide and (2) particles of said faujasite Y zeolite having a unit lattice constant of 24.25 to 24.50 Å and a particle size distribution consisting of up to 20 wt.% of particles having particle diameters of 3 microns or smaller, from 50 to 70 wt.% of particles having particle diameters of from 3 to 12 microns, and from 10 to 40 wt.% of particles having particle diameters of from 12 to 30 microns, and forming the mixtures into particles having desired shape and dimensions, and then drying and calcining the particles, said catalyst having at least 0.1 ml/g of pore volume of pores having a pore diameter of 600 Angstrom units or larger.

2. A hydrotreating catalyst according to claim 1, wherein said carrier comprises 20–80 wt.% of said zeolite and 80–20 wt.% of said alumina-containing inorganic oxide.

3. A hydrotreating catalyst according to claim 1, wherein said alumina-containing inorganic oxide is selected from the group consisting of alumina, alumina-silica, alumina-boria, alumina-titania and alumina-zirconia.

4. A hydrotreating catalyst according to claim 1, wherein said precursor of said alumina-containing inorganic oxide comprises an alumina hydrate consisting essentially of a pseudoboehmite having a crystal size in the range of 50–150 Å.

5. A hydrotreating catalyst according to claim 1, wherein said hydrogenation component composed of a metal selected from Group VIA of the Periodic Table is contained in a quantity of 5–20 wt.% calculated as the oxide, and said hydrogenation component composed of a metal selected from Group VIII of the Periodic Table is contained in a quantity of 1–10 wt.% calculated as the oxide.

6. A hydrotreating catalyst according to claim 1, wherein said metal selected from Group VIA of the Periodic Table is molybdenum and/or tungsten.

7. A hydrotreating catalyst according to claim 1, wherein said metal selected from Group VIII of the Periodic Table is cobalt and/or nickel.

8. A hydrotreating catalyst according to claim 1, wherein the faujasite Y zeolite has the following particle size distribution:

Particle size distribution

| Particle diameter 3μ or less | 10–18 wt. % |
|---|---|
| Particle diameter 3–12μ | 51–68 wt. % |
| Particle diameter 12–30μ | 14–38 wt. %. |

9. A hydrotreating catalyst according to claim 1, wherein said metals are molybdenum and cobalt and are carried on said carrier in the form of oxides.

10. A hydrotreating catalyst according to claim 1, wherein said metals are molybdenum, cobalt and nickel and are carried on said carrier in the form of oxides.

* * * * *